INVENTOR
Ralph Cover
Paul F. Cover

BY Cushman, Darby & Cushman
ATTORNEYS

Oct. 24, 1961 R. COVER ET AL 3,005,718
METHOD OF MAKING CREAM STYLE CORN
Filed July 24, 1959 3 Sheets-Sheet 3

INVENTOR
Ralph Cover
Paul F Cover
BY Cushman, Darby & Cushman
ATTORNEYS

United States Patent Office 3,005,718
Patented Oct. 24, 1961

3,005,718
METHOD OF MAKING CREAM STYLE CORN
Ralph Cover and Paul F. Cover, Westminster, Md., assignors to The United Products Co., Westminster, Md., a corporation of Maryland
Filed July 24, 1959, Ser. No. 829,244
13 Claims. (Cl. 99—186)

This invention relates to corn products and processing and more particularly to an improved process for preparing cream style corn and the product resulting from such process.

In the early development of the art of preparing cream style corn, a widely used commercial process involved the steps of first mechanically cleaning the husked ears with the use of water to remove as much of the silk and other foreign material adhering to the outside of the ears as possible; next the ears of corn were cut and mechanically scraped to remove the kernels from the cob, and finally the kernels removed by cutting and scraping were mechanically cleaned in the best practical manner, the corn product resulting from the cutting and scraping after the cleaning step being mixed and heated with the proper amount of water, salt, sugar and sometimes cornstarch and subsequently packaged and then heat treated.

This method of preparing cream style corn had the disadvantage that the cob scraping operation resulted in the intermixing of the kernels thus removed with many types of objectionable foreign material, such as the fine fuzzy tissues surrounding the kernel, silk, cob particles and worms.

These disadvantages of the early commercial process were overcome to a large extent by the process described in Cover Patents 2,484,375 and 2,484,376 issued October 11, 1949. In general, these patents disclose that the foreign material such as cob tissue, silk, worms and the like which were often included in the product produced by the old scraping method of preparing cream style corn, could be eliminated by eliminating the step of scraping the cobs so that the kernels could be cleaned in a whole state rather than in a scraped mass. That is, where the cobs are scraped to obtain the cream constituent of the product, separation of the undesirable foreign material such as silk, cob tissue and worms from this scraped mass was extremely difficult, if not impossible. In the method of the Cover patents the kernels are cut from the cobs as whole or substantially whole kernels and the cleaning of the kernels is carried out while they are in this state, thus rendering the cleaning operation much easier and more effective. After the cleaning has taken place, a portion of the cleaned kernels could then be ground up to form the cream constituent of the product.

As disclosed in the above-mentioned Cover patents, it is desirable to utilize the more mature corn as the cream constituent. In actual practice, a processor utilizing the procedures of these patents would sample each field run of corn received for processing and if the sample proved that the field run was of a more advanced average maturity, the entire field run would be utilized as the cream constituent. On the other hand, where tests of the sample indicated that the average maturity of the field run was less advanced, this corn would be utilized as the kernel constituent of the product.

Thus, while the disclosures of these Cover patents appear to recognize the desirability of utilizing the more mature corn as the cream constituent, in actual practice, there has been no attempt up until the time of the present invention to make a separation according to maturity with respect to any particular field run.

There have been some attempts to make an initial manual separation by visual inspection in order to generally group the ears of a field run so that they could be fed selectively through one or more of a plurality of cutting heads. The purpose of the latter attempts was solely to improve the cutting action of the cutting heads, the kernels thus cut by the separate cutting heads being immediately intermixed. The results achieved in regard to an improved cutting action did not prove to be sufficiently good to warrant the continued practice of the separation.

In our co-pending application Serial No. 685,866 filed September 24, 1957, now Patent No. 2,951,484, there is disclosed for the first time the concept of actually separating the kernels cut from ears of a particular field run for the purpose of quality discrimination in the product produced, this separation being in relation to the size of the ears. As disclosed in the above-mentioned co-pending application, it has been found that ear size bears a significant relationship both to maturity and moisture content and, therefore, size separation can be employed to obtain a quality separation. The present invention is based upon the underlying concept set forth in the above-mentioned co-pending application and to this extent the present application constitutes a continuation-in-part of application Serial No. 685,866, now Patent No. 2,951,484.

In the processes of the above-mentioned Cover patents, the cream constituent of the product is preferably obtained from a field run of corn having a more advanced average maturity. Of course, within this field run there will be a good percentage of ears having a maturity which is suitable for utilization as the kernel constituent, or, in other words, a maturity considerably less advanced than the average. Conversely, the field run of corn having a less advanced average maturity which is utilized as the kernel constituent of the product will contain a good percentage of ears having an advanced maturity which would be suitable only for the cream constituent, or in other words, a maturity considerably more advanced than the average. This latter factor is considerably more important in that when this percentage of more mature ears is included in the kernel constituent the resulting product is down graded and the taste, appearance and flavor of the product are detrimentally affected.

In the present process, selection of the ears to be utilized as the cream constituent in the product is not obtained by choosing an entire field run which has a sampled more advanced average maturity stage, but rather each field run can be treated in the same manner, and separation of the large ears from the medium and small ears in accordance with the present invention will result in the utilization of substantially all of the ears having an advanced stage of maturity in the cream constituent. That is, since size bears a definite relationship to maturity a separation according to size will result in a maturity separation to a considerable extent. Tests have shown that the moisture content, which is also an attribute of maturity, between the large ears and the medium and small ears varies as much as 6% and more. By separating out the kernels from the large ears which have less moisture content, and utilizing these kernels solely in the cream constituent, the resulting product is much more pleasing in appearance and color and has a better taste and consistency. More over, the resulting product is upgraded in accordance with the U.S. Department of Agriculture standards for grades of canned or frozen corn, cream style, so that the processor can obtain a better price for the field run processed in accordance with the present invention.

Accordingly, it is an object of the present invention to provide a cream style corn product having improved appearance, flavor, tenderness or maturity and consistency.

Another object of the present invention is the provision of a method of preparing a cream style corn product of the type described, which enables the processor to obtain a better quality product from a given field run of corn.

These and other objects of the present invention will become more apparent during the course of the following detailed description and appended claims.

The invention may best be understood with reference to the accompanying drawings wherein an illustrative embodiment is shown.

Figure 1:
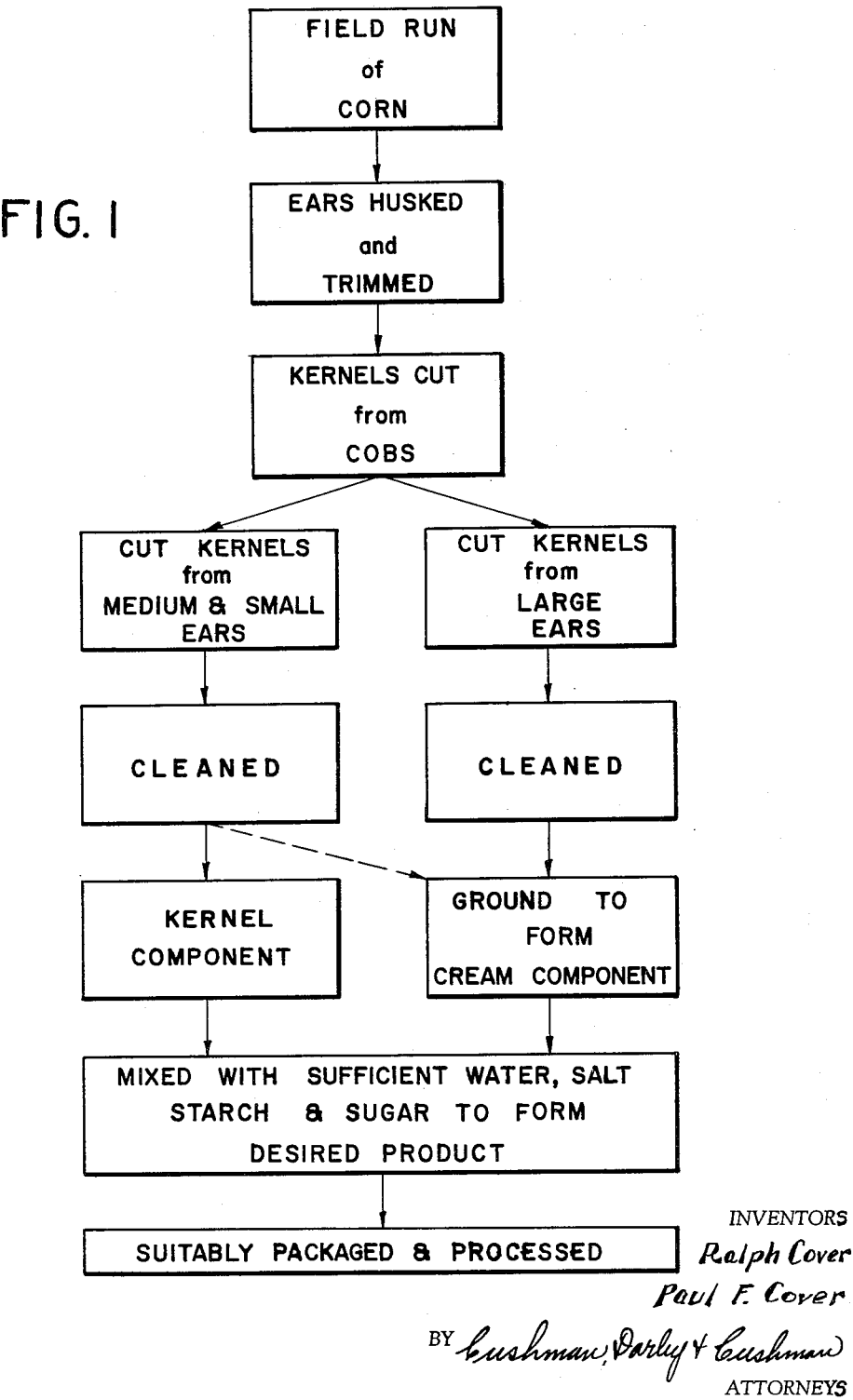
FIGURE 1 is a flow sheet illustrating a preferred method embodying the principles of the present invention.
Figure 2:
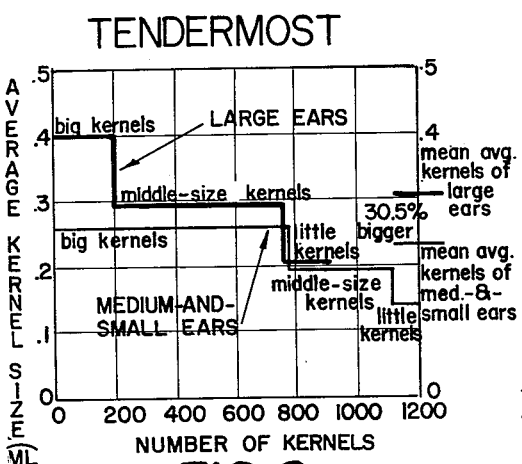
FIGURES 2–7 are graphical views which show the sizes of kernels obtained from a field run of corn of various corn varieties.
Figure 3:
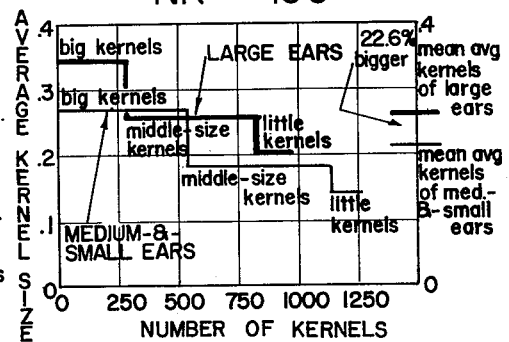
Figure 4:
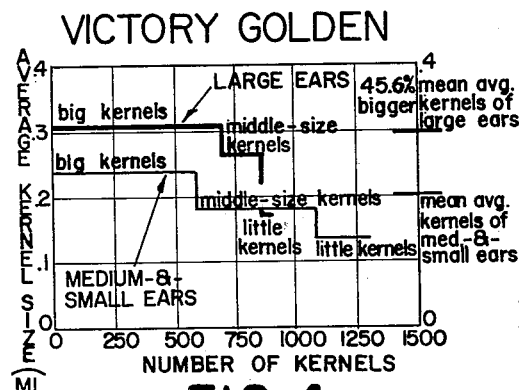
Figure 5:
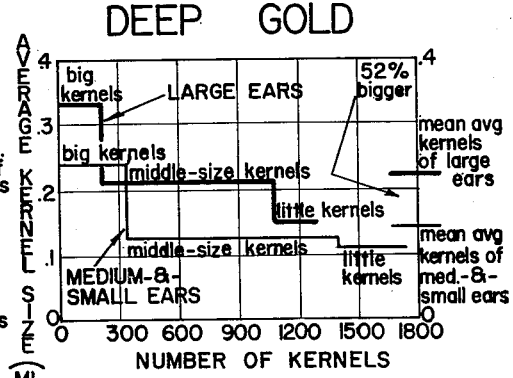
Figure 6:
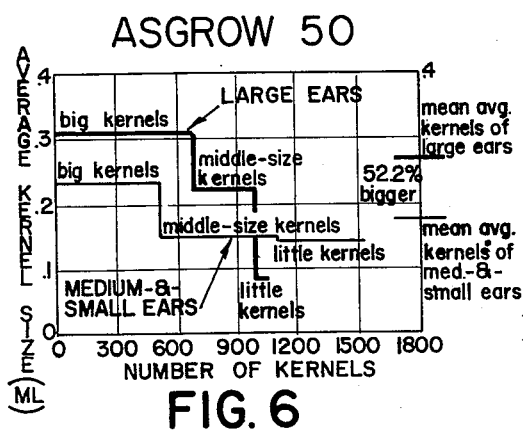
Figure 7:
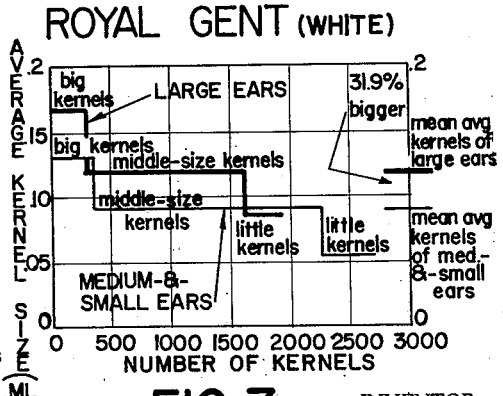
Figure 8:
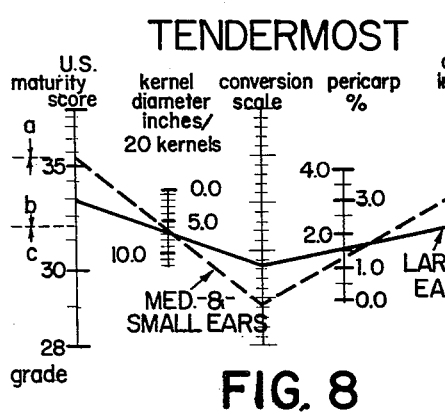
FIGURES 8–13 are graphical views of trimetric test data obtained from various corn varieties.
Figure 9:
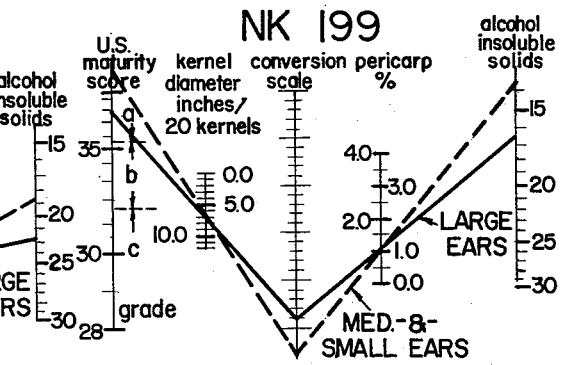
Figure 10:
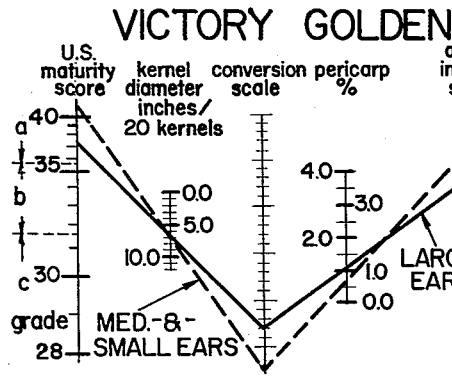
Figure 11:
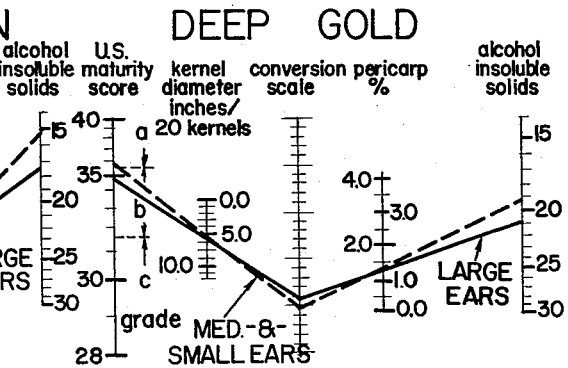
Figure 12:
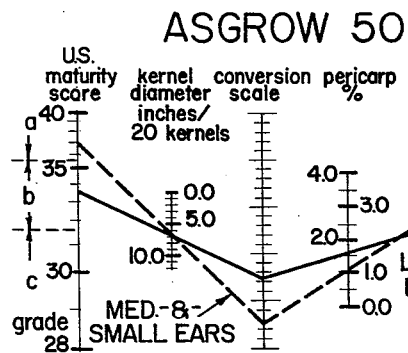
Figure 13:
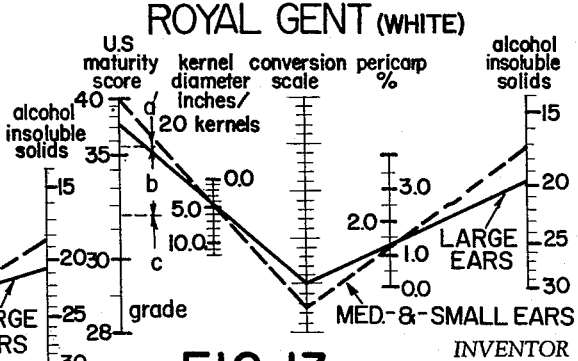

Referring now more particularly to FIGURE 1 of the drawings, there is shown a flow diagram which generally illustrates the steps of the process of the present invention. In general, the ears harvested from a field run are first husked and trimmed. Next, the kernels are cut from the cobs of the ears and the cut kernels are separated into at least two groups, one, the kernels cut from medium and small ears, and the other, kernels cut from the large ears. Next, the two groups of cut kernels are suitably cleaned, and the cleaned cut kernels from the medium and small ears are then utilized as the kernel component of the product. The cleaned kernels cut from the large ears are reduced to a finely divided state and, if necessary in order to obtain the requisite volume of cream, a portion of the cleaned kernels cut from the medium and small ears may also be reduced along with the kernels cut from the large ears, to form the cream component. Finally, the kernel component and cream component are mixed together under heat with sufficient water, salt, sugar and starch if desired, to form the desired product and this mixture is then suitably packaged. Where the product is canned, the filled cans are sterilized by subjecting the same to an elevated temperature for a predetermined time. Where the product is packaged to be frozen, the sterilizing step is eliminated.

The husking and trimming of the ears harvested from a field run of corn can be carried out by any of the well-known machines commercially available for this purpose. In a conventional cannery, the field run of corn is first run through the husking machinery from which it is received on conveyors where trimming and ear-cleaning machinery and visual inspection are used to clean the ears as well as possible before cutting. From the inspection belt the husked and trimmed ears are then fed to the cutting machines.

A preferred manner of carrying out the kernel cutting step of the present process is to utilize cutting machines such as disclosed in the above-mentioned co-pending application. With the use of these machines, the exterior diameter size of each ear is sensed just prior to the cutting operation and in accordance with the size thus sensed the kernels subsequently cut from the cob are selectively directed along one of a plurality of paths, preferably two. In a normal installation there will be provided a divided conveyor for receiving the kernels cut by the machine, one conveyor receiving the kernels cut from the large ears and one conveyor receiving the kernels cut from the medium and small ears.

Preferably, although not necessarily, the cut corn kernels are processed through a silker which removes large pieces of cob tissue, many silks, some husks and breaks up clusters of grains which sometimes cling together, particularly if the cutting machine operates efficiently. The silker comprises a plurality of separated wires forming a tray onto which the cut corn kernels are placed. The corn silks cling to the wires of the silker, while the pieces of cob are retained on the wires through which the cut corn kernels pass. From the silker, the cut corn kernels preferably, although not necessarily, are cleaned and screened in a shaker-rinser. The shaker-rinser comprises a screen table divided into two screens through which the cut corn kernels are incapable of passing, while the chits or hearts of the corn and other finely divided matter pass through the screen. This second part of the screen of the shaker-rinser usually has water running on it, while the first part of the screen may have water running on it although preferably it does not. From the silker or shaker-rinser, or if neither a shaker-rinser or silker is employed, from the cutting machine, the cut corn kernels preferably are placed in a flotation washer, which is fundamentally a separator in which water is used to separate the cut corn kernels from the cob tissues, corn silks and worms by flotation. Desirably, there is a surface current on the top of the water in the flotation washer, and the cut corn kernels are dropped into this surface current. Cob tissues, worms and corn silks float away. In addition, immature corn too young for canning and pithy grains also float away, while the cut corn suitable for the corn product drops to the bottom of the flotation washer. The cut corn kernels preferably, although not necessarily, then are passed over another shaker-rinser having two screens, the first of which is maintained in a wet condition by the continual passage of water therethrough, while the second is in a dry condition. After passing through this shaker-rinser, the kernels preferably are discharged onto an inspection belt, which moves the cut-and-cleaned corn in front of one or more inspectors who review the corn once more to eliminate any unwanted waste material. If the shaker-rinser is not employed, the corn kernels are taken directly from the flotation washer. If the inspection belt is not employed, the corn kernels generally are taken directly from the shaker-rinser or from the flotation washer. In some installations, one or more pumping and dewatering steps may intervene at various stages of procedure. After the final cleaning and/or inspection action, the cut corn kernels are ready for the preparation of the mixture of the present product.

The product of the present invention, like the product described in the above-mentioned Cover patents, comprises two corn components, one a kernel component and the other a finely divided component or cream constituent. The kernel component consists of corn kernels cut from the medium and small ears only. Desirably, the size of the individual kernels of the kernel component is at least 30% of the whole kernel and the size is preferably from 40 to 90% of the whole kernel. The finely divided component is prepared from whole kernels and parts thereof cut from the large ears and desirably these corn kernels prior to reduction to a finely divided state are not smaller than 30% of the whole kernel.

The terms large, medium and small ears utilized above are relative terms which will vary in actual dimension depending upon the particular variety of corn and the particular field run. Examples of dimension variance between the various varieties is set forth in Table 1, which indicates the round-figure approximate percentages of the respective volumes in the field run of corn of various varieties which would be expected under normal growing conditions.

Table 1 also includes round figures obtained from an extensive test program conducted in a number of corn plants on six of the major hybrid sweet corn varieties. In 1958, crop conditions within the test area were the most unfavorable in the plants' corn packing lifetime. The crop produced was actually less than half a normal crop from the beginning to the end of the seasons for all varieties handled.

TABLE 1

| 1 | 2 | 3 | 4 | 5 | 6 | 7 | 8 | 9 | 10 |
|---|---|---|---|---|---|---|---|---|---|
| Variety | Large Ears | | | Medium ears | | | Small ears | | |
| | Maj. dia. | Percent total normal | Ears 1958, percent | Maj. dia. | Percent total normal | Ears 1958, percent | Maj. dia. | Percent total normal | Ears 1958, percent |
| Tendermost | 2 1/16"-up | 20 | 10 | 1 7/8" to 2"+ | 60 | 55 | Under 1 7/8" | 20 | 35 |
| NK 199 | 2 5/16"-up | 15 | 10 | 2 1/16" to 2 1/4"+ | 75 | 70 | Under 2 1/16" | 10 | 20 |
| Victory Golden | 2 1/16"-up | 10 | 5 | 1 7/8" to 2"+ | 65 | 55 | Under 1 7/8" | 25 | 40 |
| Deep Gold | 2 3/16"-up | 15 | 10 | 1 15/16" to 2 1/8"+ | 70 | 60 | Under 1 15/16" | 15 | 30 |
| Asgrow 50 | 2 1/16"-up | 10 | 5 | 1 7/8" to 2"+ | 65 | 55 | Under 1 7/8" | 25 | 40 |
| Royal Gent (white) | 2 3/16"-up | 15 | 10 | 1 15/16" to 2 1/8"+ | 70 | 65 | Under 1 15/16" | 15 | 25 |

From the above it can be seen that in any given field run of corn, the minimum dimension of the large ears will vary in accordance with the variety of corn in the field run. Thus, the term large ear does not refer to any specific dimension but relates more to a minimum size range within which a percentage of approximately 10-20% of the entire field run of corn would usually fall. Of course, these percentages are based upon normal growing conditions and in years where there are abnormally unfavorable crop conditions the percentage may be as low as approximately 5%, as can be seen in the table from the 1958 figures. On the other hand, in abnormally favorable years the percentage may increase to approximately 25%.

It will be noted that there is also a variance in the actual dimensional range of the medium ears between different varieties. Again, a medium ear is best defined as an ear having a size within a specified range within which 60–75% of the ears of an entire field run would fall. As indicated above, the percentages relating to medium and small ears are given for normal growing conditions and upper and lower limitations thereof will vary under abnormally good and bad conditions, an example of which is given for the abnormally poor 1958 season in the table. Thus, under normal conditions the minimum siphoning out of the corn from the large ears in order to insure the best quality of whole kernel corn from the medium and small ears would be at the size point designated in column 2 of Table 1.

The predetermination of the ear diameter size separation point preferably should be controlled by variety and corn condition. The most desirable point is that which provides for cream component making purposes all of the kernels which would degrade the finished product when in the kernel component of the product. If, for example, 40% of the overall available kernel volume were needed for cream component making purposes and if a separation of 15 to 20% of the overall available kernel volume would eliminate the undesirable kernels from the kernel component, the separation could be at the point which would provide about half or even less than half of the kernel volume needed for the cream component. The remainder of the kernels required for the cream component would then be obtained from the kernels cut from the medium and small ears.

The main purpose of the size separation is to eliminate from the kernel component the objectionable large ear corn quality characteristics and to thereby provide for the cream component the actually more desirable kernels from the large ears. Indeed, an ideal condition is that created when the processor packs both cream style corn and whole kernel corn simultaneously, and when both end products are upgraded by the separation at the predetermined ear diameter point which would give adequate kernels from the large ears to make all of the cream component and still leave in whole kernel form from medium and small ears enough kernels, not only for the kernel component of the cream style corn product but also enough for a production line of whole kernel corn as well.

Of course, many processors will not be packing both cream style corn and whole kernel corn simultaneously so that the ideal conditions noted above are not always possible. Where the processor is packing only cream style corn, the 50% figure noted above has been found preferable. That is, rather than to attempt to separate the corn at a point which would provide a flow of completely uniform percentages of volume on both sides of the divided corn belt, the preferred procedure would be to effect separation at a point just sufficiently low that all of the corn which would degrade the finished product when in the kernel component is eliminated. In actual practice, this will amount to approximately 50% by weight of the total kernels utilized to form the cream component coming from the large ears with the remaining approximately 50% by weight obtained from the kernels cut from the medium and small ears.

From the above it can be seen that it is preferable that the finely divided component or cream constituent be prepared only from kernels cut from large ears. This does not mean that the separation point should be lowered so that ears having a diameter equal to and above the separation point will provide all of the kernels for cream component making purposes. On the contrary, it is preferable to determine the separation point at a maximum value which would insure that all of the kernels from the larger ears which would degrade the finished product are eliminated from the kernel component. Where this predetermined size does not supply sufficient kernels with which to prepare the cream component, it is preferable to supply the needed kernels from those cut from the medium and small ears, rather than to lower the size of the separation.

It should be noted that the actual dimensions included in Table 1 refer to the major diameter dimension of the ears before the kernels are cut from the cobs. It will be understood that the diameter of a given ear of corn will vary throughout its length and this is particularly true of the modern hybrid varieties which are often radically tapered. In addition, not only are the ears tapered from end to end, but there is virtually always a flat side on every ear of corn, and sometimes there are two flat sides throughout the length of the ears and they even may be oval in general shape. In determining diameter size in accordance with the present invention such flat sides are disregarded and the size for purposes of separation will be the largest diameter which can be found on any part of the length of the tapered ear. Usually this largest diameter will occur inwardly of the butt end of the ear approximately 20% of the entire length. The size sensing mechanism embodied in the cutting machine disclosed in our co-pending application automatically determines the largest diameter of the tapered ear upon which it is operating and, to a large extent, disregards the flat side or sides of the ear. For this reason, the use of this mechanism is greatly preferred in carrying out the size separation of the present invention. By mechanically contacting each ear of the entire field run, greater accuracy can be obtained than would be possible by manual separation.

Preferably, the kernels from all of the large ears and those from medium and small ears which are utilized to prepare the finely divided component or cream constituent are reduced to a finely divided mass by means of the apparatus disclosed in Cover Patent No. 2,878,847. The grinding operation achieved by the machine of Patent No. 2,878,847 reduces the kernels to a mass which is sufficiently fine to pass through at least an eight, and preferably a ten-mesh sieve to produce a finely divided component containing substantially none of the whole hulls of corn kernels from which it is prepared. That is, in the grinding operation the hulls or pericarp of the kernels are themselves reduced to a finely divided state along with the remainder of the kernels utilized so that the entire mass including the divided hulls can pass through at least an eight-mesh sieve, and preferably a ten-mesh sieve.

Finally, in preparing the product of the present invention, the finely divided component and kernel component are mixed together with water, sugar, salt and starch to obtain a proper viscosity, appearance or character, and flavor. Of course, the proportions of the various components which are mixed together to form the product will vary depending upon the condition and maturity of the corn and upon growing conditions. Preferred mixture ranges to obtain approximately 1000 pounds of cold finished product are as follows:

Kernel component, 230–350 pounds
Cream component, 300–400 pounds
Water, 160–300 pounds (20–35 gallons)
Starch, 15–18 pounds (thoroughly premixed in cold water, at the rate of 1 pound of starch per quart of water)
Sugar, 60–65 pounds
Salt, 8½–9 pounds.

It will be understood that the product thus mixed is then suitably cooked and packaged either as canned creamed corn or frozen creamed corn. Where the mixture is to be canned, it is then heated in a mixer to a temperature of between 180° F. and 190° F. and maintained at that temperature for a period of 6–8 minutes. The heated mixture is then canned and the canned product is sterilized by subjecting the same to a temperature of 245° F. for 65 minutes or 240° F. for 75 minutes. The cans are then cooled to room temperature.

With respect to the 1958 field run tests, products of the present invention were made from each of the six varieties of corn specified in Table 1, utilizing the method of the present invention as outlined above. A specific example of the practice employed in the test runs is as follows.

From a field run of corn of the Victory Golden variety, the ears were first husked and trimmed. Then the husked and trimmed corn was weighed to provide 2000 pounds of cut and cleaned corn for the specified run, and then fed to a cutting machine such as disclosed in the above-mentioned co-pending application. The separating mechanism of the machine was set to make separation between the kernels cut from the ears having a major diameter of 2¹⁄₁₆″ and above, and the kernels cut from ears having a diameter less than 2¹⁄₁₆″. The cutting depth of the blades of the cutting head was ⁵⁄₁₆″ at a diameter of 2″ and the cutting blades were set in relation to the depth gauges to follow the cob contour with a specific setting of B, D, J, Q, such as illustrated in the table set forth in the specification of the above-mentioned copending application.

After the cutting operation, the two groups of uncleaned cut kernels were weighed and then successively run through a commercial five-piece cleaning line in the sequence of (a) silker, (b) shaker-rinser, (c) flotation washer, (d) shaker-rinser, (e) inspection belt, (f) shaker-rinser. The cream component was formed by feeding cleaned cut kernels to the grinding mechanism of Cover Patent 2,878,847. Of the kernels fed to the grinder, 100% were cut from the large ears. These kernels were reduced in the grinder to a divided mass sufficiently fine to be washable through an eight-mesh sieve with water. 330 pounds of the finely divided component thus prepared was mixed with 300 pounds of the kernels cut from the medium and small ears and 27 gallons of water having dissolved therein 16 pounds of starch, 62 pounds of cane sugar and 8½ pounds of salt. The resulting mixture was then heated for a period of about 7 minutes in a batch mixer at 190° F. The heated mixture was then canned, sterilized for 65 minutes at 245° F. and cooled.

The superior appearance, color, flavor, taste and consistency of the product of the present invention was evident both from sensory and laboratory sampling at the time of canning and several months later. In order to show that these significant improvements are a result of the size separation employed in preparing the present product, tests were performed to determine the difference in quality between the kernels cut from the medium and small ears and the kernels cut from the large ears when the latter are in a whole kernel state rather than being reduced to finely divided form.

Three of the most significant objective criteria in determining the quality of a corn product are the moisture content, percentage of alcohol insoluble solids and grain size. Table 2 set forth below indicates these values for the six varieties tested, particularly with reference to the kernels cut from the medium and small ears and the kernels cut from the large ears in their whole state. The kernel sizes were arbitrarily divided into three different classifications; big, middle-size, and little kernels. Again, no specific numerical ranges were set in determining

TABLE 2

| 1 | 2 | 3 | 4 | 5 | 6 | 7 | 8 | 9 | 10 | 11 | 12 |
|---|---|---|---|---|---|---|---|---|---|---|---|
| Variety | Kernel source | Moisture content, percent | Alcohol insoluble solids, percent | Overall avg. kernel size | Number big kernel | Avg. size big kernel | Number middle size kernel | Avg. size middle size kernel | Number little kernel | Avg. size little kernel | Comparable kernel size (avg. lg. ears vs. avg. med. and sm. ears), percent larger |
| Tendermost | Large ears | 70 | 21.7 | .304 | 202 | .401 | 562 | .295 | 147 | .205 | 30.5 |
| Do | Medium and small | 74 | 18.7 | .233 | 787 | .257 | 332 | .198 | 79 | .139 | |
| NK 199 | Large ears | 72 | 16.2 | .260 | 285 | .344 | 526 | .253 | 195 | .159 | 22.6 |
| Do | Medium and small | 78 | 13.4 | .212 | 541 | .264 | 599 | .180 | 127 | .142 | |
| Victory Golden | Large ears | 72 | 17.4 | .300 | 705 | .312 | 171 | .270 | 27 | .185 | 45.6 |
| Do | Medium and small | 76 | 15.2 | .205 | 587 | .240 | 504 | .188 | 174 | .139 | |
| Deep Gold | Large ears | 70 | 20.6 | .224 | 209 | .335 | 871 | .215 | 210 | .152 | 52 |
| Do | Medium and small | 74 | 19.2 | .165 | 413 | .218 | 1,085 | .157 | 208 | .101 | |
| Asgrow 50 | Large ears | 70 | 20.5 | .271 | 688 | .313 | 312 | .224 | 62 | .085 | 52.2 |
| Do | Medium and small | 74 | 18.2 | .171 | 505 | .237 | 622 | .149 | 386 | .147 | |
| Royal Gent | Large ears | 72 | 19.5 | .120 | 342 | .170 | 1,283 | .121 | 335 | .086 | 31.9 |
| Do | Medium and small | 76 | 18.1 | .091 | 374 | .131 | 1,854 | .091 | 414 | .055 | | these categories as they varied with respect to each variety and with respect to whether or not the kernels were cut from the large ears or the medium and small ears. The kernel-counts represents the number of kernels of each kind in one No. 303 can of whole kernel corn from each of the respective categories. That is, for each variety two cans were filled, one containing all of the kernel sizes from the large ears and the other can containing all of the kernel sizes from the medium and small ears.

The facts set forth in Table 2 which relate to the number of grains and grain sizes can be reduced to graphic form by plotting the kernel size against the number of kernels for each variety tested, both with respect to the kernels from the large ears and the kernels from the medium and small ears. These graphs are illustrated in the drawings as FIGURES 2–7.

At canning time, the moisture content of the corn was measured by appropriate instruments and the raw corns were evaluated by qualified graders. Then several months later maturity of the corn in the can was measured objectively by the trimetric test method and the finished products in the can were also evaluated by comptent test panels. The trimetric test method utilizes the percentage of alcohol insoluble solids, the percentage of pericarp and kernel size to determine the maturity factor and has proven to be quite reliable in checking the tenderness-maturity factor under all conditions of varietal, climatic and geographic variations and has not clashed with the human evaluations as obtained by sensory testing panels.

The graphs illustrated in FIGURES 8–13 indicate the results of these trimetric tests for the six varieties as tested. The quality of the whole kernel products at canning time and some months later is indicated below in Table 3.

mere size grading of the kernels after cutting. The graphs clearly establish that the kernel character factors prevail not merely in the kernels of a certain size, but in all of the kernels of all sizes on the large ears of any variety. Indeed, the modern hybrid ears tend more and more to be radically tapered from end to end, resulting in the kernels being of widely different sizes from the same ear and adding greatly to the difficulty of obtaining maximum quality from the available raw stock. By providing size separation according to ear diameter, the problems resulting from the character differences between the top and bottom ears on the same stalk and between the ears in the hills and the valley in the same field have been largely overcome. With present practices employing mechanical harvesting there can be no selection in the field by hand pickers and all ears are brought in on the same load. The present invention provides a simple and effective procedure for utilizing corn thus obtained in the most efficient manner whereby the finished product contains the same corn as would be contained in the product employing previous procedures, but the components thereof are from the parts of the field run of corn from each load which best serve the quality needs of the respective component.

The greatest significance of Table 3 is the indication that invariably, the kernels from the medium and small ears of whatever moisture content and whatever variety are upgraded in quality in every value factor when disassociated from the kernels from the large ears. Maturity-wise and kernel-size-wise, the separating procedure of the present invention serves to upgrade the product from one-half to a full grade from the same raw stock. The effects upon kernel size and uniformity in the end products assume major significance when whole kernel corn is composed from kernels from the medium and

TABLE 3

| 1 | 2 | 4 | 4 | 5 | 6 | 7 |
|---|---|---|---|---|---|---|
| | | | | Trimetric test of tenderness-maturity factor | | |
| Variety | Kernel source | Moisture content, percent | Raw product grade | Score | Grade | Finished product grade |
| Tendermost | From large ears | 70 | Extra std | 33— | Extra std | Extra std. |
| Do | From medium and small ears | 74 | Fancy | 36— | Low fancy | Fancy. |
| NK 199 | From large ears | 72 | Low fancy | 37½ | Fancy | Low fancy. |
| Do | From medium and small ears | 78 | Top fancy | 40++ | Top fancy | Top fancy. |
| Victory Golden | From large ears | 72 | Low fancy | 37— | Low fancy | Low fancy. |
| Do | From medium and small ears | 76 | Top fancy | 40+ | Top fancy | Top fancy. |
| Deep Gold | From large ears | 70 | Extra std | 35 | Near fancy | Near fancy. |
| Do | From medium and small ears | 74 | Low fancy | 36 | Low fancy | Low fancy. |
| Asgrow 50 | From large ears | 70 | Extra std | 33½ | Extra std | Extra std. |
| Do | From medium and small ears | 74 | Low fancy | 37 | Fancy | Fancy. |
| Royal Gent (white) | From large ears | 72 | ----do---- | 37 | ----do---- | Low fancy. |
| Do | From medium and small ears | 74 | Fancy | 39 | High fancy | Fancy. |

It is evident from the above that the kernels from the large ears would be objectionable in the kernel fraction of the cream corn product. The large ear kernels are objectionable visually because of their actual or comparative size and their more mature appearance. Even when young, they suggest the presence of more mature corn in the package. The pericarp or hull of the large ear kernels is somewhat thicker and certainly tougher in whole kernel form than when reduced to cream form. Organoleptically, this less satisfactory hull tenderness and an unfavorable difference in texture of the endosperm produce in the large ear kernels an inferior whole kernel character. The kernels from the large ears contain more starch and they are therefore desirably included in the cream component, thereby making possible the utilization of less added powdered field corn starch in the product to obtain the desired product viscosity. Chemically, the alcoholic insoluble solids are substantially greater in the large ear kernels and these are much less objectionable in reduced cream form than in the kernel fraction.

It is important to note that the advantages of the size separation of the present invention cannot be obtained by small ears only. Higher quality levels are obtained from no better raw stock because the large ear kernels, which heretofore have added to the problem, now can be separated off for use in the cream constituent. The same kernels from the large ears regardless of moisture content which generally may degrade whole ernel corn, now serve to upgrade the cream style products.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. In a process of preparing cream style corn which includes a corn kernel component mixed with a cream component made of finely divided corn kernels, the improvement which comprises the steps of measuring the major diameter size of uncut ears and utilizing as the kernel component only kernels cut from the cobs of ears having a major diameter less than a size smaller than the largest size of the ears measured.

2. In a process of preparing cream style corn which includes a corn kernel component mixed with a cream component made of finely divided corn kernels, the improvement which comprises the steps of measuring the major diameter size of uncut ears and utilizing as the kernel component only kernels cut from the cobs of ears having a major diameter less than a predetermined size, said predetermined size being between approximately 2 1/16 inches and 2 5/16 inches.

3. In a process of preparing cream style corn which includes a corn kernel component mixed with a cream component made of finely divided corn kernels, the improvement which comprises the steps of measuring the major diameter size of uncut ears and utilizing as the kernel component only kernels cut from the cobs of ears having a major diameter less than a predetermined size said predetermined size being not greater than the smallest size of the largest ears constituting from between 5% to 25% of the field run of corn from which the measured ears are taken.

4. In a process of preparing cream style corn which includes a corn kernel component mixed with a cream component made of finely divided corn kernels, the improvement which comprises the steps of measuring the major diameter size of uncut ears, utilizing as the kernel component only kernels cut from the cobs of ears having a major diameter less than a predetermined size and utilizing corn kernels in the finely divided cream component at least a portion of which are cut from the cobs of ears having a diameter not less than said predetermined size.

5. In a process of preparing cream style corn which includes a corn kernel component mixed with a cream component made of finely divided corn kernels, the improvement which comprises the steps of measuring the major diameter size of uncut ears, utilizing as the kernel component only kernels cut from the cobs of ears having a major diameter less than a predetermined size and utilizing corn kernels in the finely divided cream component approximately 50% of which are cut from the cobs of ears having a major diameter not less than said predetermined size and approximately 50% of which are cut from the cobs of ears having a major diameter less than said predetermined size.

6. A process of preparing cream style corn which comprises husking and trimming ears of corn harvested from a field run, measuring the major diameter size of the field run ears cutting the kernels from the cobs of the field run ears, separating the kernels cut from the cobs of the field run ears into first and second groups according to said measurement, said first group consisting of kernels cut from the cobs of the larger diameter ears constituting from 5% to 25% of the ears of said field run, said second group consisting of kernels cut from the cobs of the smaller diameter ears constituting from 75% to 95% of the ears of said field run, obtaining a kernel component from said second group only, and mixing said kernel component with a cream component obtained by reducing to a finely divided state kernels at least a portion of which are from said first group.

7. A process as defined in claim 6 wherein approximately 50% of the reduced kernels constituting said cream component are from said first group and approximately 50% are from said second group.

8. A process as defined in claim 6 wherein the reduced kernels constituting said cream component are from said first group only.

9. A process of preparing cream style corn which comprises the steps of cutting the kernels from the cobs of the ears utilized in substantially whole kernel form, measuring the major diameter size of the ears used prior to cutting, utilizing said measurement to effect a separation of the kernels cut from the cobs of ears having a major diameter not less than a predetermined size from the kernels cut from the cobs of ears having a major diameter less than said predetermined size, forming a cream component by reducing cut kernels to a finely divided state at least a portion of which are cut from the cobs of ears having a major diameter not less than said predetermined size, and mixing the cream component with a kernel component containing only kernels cut from the cobs of ears having a major diameter less than said predetermined size.

10. A process of preparing cream style corn which comprises the steps of cutting the kernels from the cobs of the ears utilized in substantially whole kernel form, measuring the major diameter size of the ears used prior to cutting, utilizing said measurement to effect a separation of the kernels cut from the cobs of ears having a major diameter not less than a predetermined size from the kernels cut from the cobs of ears having a major diameter less than said predetermined size, forming a cream component by reducing to a finely divided state only the kernels cut from the cobs of ears having a major diameter not less than said predetermined size, and mixing the cream component with a kernel component containing only kernels cut from the cobs of ears having a major diameter less than said predetermined size.

11. A process of preparing cream style corn which comprises the steps of cutting the kernels from the cobs of the ears utilized in substantially whole kernel form, measuring the major diameter size of the ears used prior to cutting, utilizing said measurement to effect a separation of the kernels cut from the cobs of ears having a major diameter not less than a predetermined size from the kernels cut from the cobs of ears having a major diameter less than said predetermined size, forming a cream component by reducing to a finely divided state the kernels cut from the cobs of ears having a major diameter not less than said predetermined size and a portion of the kernels cut from the cobs of ears having a major diameter less than said predetermined size, and mixing the cream component with a kernel component containing only kernels cut from the cobs of ears having a major diameter less than said predetermined size.

12. A process of preparing cream style corn which comprises the steps of cutting the kernels from the cobs of the ears utilized in substantially whole kernel form, mechanically measuring the major diameter size of the ears used prior to cutting, separating subsequent to the cutting operation the kernels cut from the cobs of ears having a major diameter not less than a predetermined size from the kernels cut from the cobs of ears having a major diameter less than said predetermined size in accordance with said measurement, forming a cream component by reducing cut kernels to a finely divided state at least a portion of which are cut from the cobs of ears having a major diameter not less than said predetermined size, and mixing the cream component with a kernel component containing only kernels cut from the cobs of ears having a major diameter less than said predetermined size.

13. A process of preparing cream style corn which comprises the steps of cutting the kernels from the cobs of the ears of a field run in substantially whole kernel form, measuring the major diameter size of the ears of the field run prior to cutting, utilizing said measurement to effect a separation of the kernels cut from the cobs of ears having a major diameter not less than a predetermined size from the kernels cut from the cobs of ears having a major diameter less than said predetermined size, said predetermined size being not greater than the smallest size of the largest ears constituting from between 5% to 25% of the field run, forming a cream component by reducing cut kernels to a finely divided state at least a portion of which are cut from the cobs of ears having a major diameter not less than said predetermined size, and mixing the cream component with a kernel component containing only kernels cut from the cobs of ears having a major diameter less than said predetermined size.

References Cited in the file of this patent

UNITED STATES PATENTS

| | | |
|---|---|---|
| 2,000,892 | Lewis | May 7, 1935 |
| 2,484,375 | Cover | Oct. 11, 1949 |
| 2,484,376 | Cover | Oct. 11, 1949 |
| 2,540,028 | Fitzpatrick | Jan. 30, 1951 |
| 2,540,745 | Link | Feb. 6, 1951 |
| 2,544,380 | Fitzpatrick | Mar. 6, 1951 |
| 2,592,988 | Whitmore | Apr. 15, 1952 |
| 2,767,101 | Ball | Oct. 16, 1956 |

OTHER REFERENCES

"Food Packer," June 1944, pages 34–35.